US012775695B2

(12) United States Patent
Misgav et al.

(10) Patent No.: US 12,775,695 B2
(45) Date of Patent: Oct. 27, 2026

(54) CODE INTEGRITY VERIFICATION MECHANISM

(71) Applicant: Fortinet, Inc., Sunnyvale, CA (US)

(72) Inventors: Omri Misgav, Herzliya (IL); Udi Yavo, Herzliya (IL); Dor Neemani, Beit She'an (IL)

(73) Assignee: FORTINET, INC., Sunnyvale, CA (US)

( * ) Notice: Subject to any disclaimer, the term of this patent is extended or adjusted under 35 U.S.C. 154(b) by 18 days.

(21) Appl. No.: 18/820,522

(22) Filed: Aug. 30, 2024

(65) Prior Publication Data

US 2026/0064826 A1 Mar. 5, 2026

(51) Int. Cl.
*G06F 21/51* (2013.01)
*G06F 21/55* (2013.01)

(52) U.S. Cl.
CPC ............ *G06F 21/51* (2013.01); *G06F 21/554* (2013.01); *G06F 2221/034* (2013.01)

(58) Field of Classification Search
None
See application file for complete search history.

(56) References Cited

U.S. PATENT DOCUMENTS 8,984,296 B1 * 3/2015 Young ..................... G06F 21/57 726/17
10,055,572 B1 * 8/2018 Celik ..................... G06F 21/44
12,079,364 B2 * 9/2024 Kuppusamy .............. G06F 8/61
2015/0007318 A1 * 1/2015 Van De Van ......... G06F 21/564 726/23
2021/0141560 A1 * 5/2021 Vajravel ................ G06F 3/0674
2021/0240816 A1 * 8/2021 Kumar ................ G06F 21/6218
2021/0308586 A1 * 10/2021 Mulasmajic ............ A63F 13/75
2022/0058271 A1 * 2/2022 Rose ..................... G06F 9/4401
2023/0281090 A1 * 9/2023 Samuel ................. G06F 21/577 726/25
2023/0297357 A1 * 9/2023 Zemla ....................... G06F 8/63 717/175
2023/0333755 A1 * 10/2023 Poosapalli ............ G06F 9/4408
2023/0334156 A1 * 10/2023 Feng ..................... G06F 21/575
2024/0152610 A1 * 5/2024 Wilson .................... G06F 21/53

OTHER PUBLICATIONS

Kálnai, Peter et al., "Lazarus & Byovd: Evil to the Windows Core", Virus Bulletin Conference Sep. 2022, pp. 1-15. (Year: 2022).*

* cited by examiner

*Primary Examiner* — Michael Pyzocha
(74) *Attorney, Agent, or Firm* — Jaffery Watson Hamilton & DeSanctis LLP

(57) ABSTRACT

A system is disclosed. The system includes one or more processing resources and a memory device, coupled to the one or more processing resource, having stored therein instructions that when executed by the processing resource cause the processing resources to detect a driver loading for execution, determine whether current baseline flag and call-back values match baseline flag and callback values, load a driver image upon a determination that the current baseline values match the baseline values and validate the driver image.

20 Claims, 7 Drawing Sheets

CODE INTEGRITY VERIFICATION MECHANISM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2024, Fortinet, Inc.

FIELD

Embodiments discussed generally relate to systems and methods for preventing malicious attacks that bypass driver signature enforcement.

BACKGROUND

Code Integrity, often referred to as Driver Signature Enforcement (DSE) implemented Microsoft® Windows® operating systems, is a threat protection feature that requires kernel drivers to be digitally signed and validated before being loaded to memory. Currently, malicious attacks may bypass this protection feature by disabling DSE during runtime. Typically, DSE is bypassed by leveraging a kernel-mode write primitive and manipulating internal OS data structures, which is achieved via exploitation of vulnerabilities in kernel components or abuse of legitimate 3rd party drivers.

Hence, there exists a need in the art for enhanced systems and methods for the prevention of bypassing driver code integrity protections.

SUMMARY

Various embodiments provide systems and methods to detect compromised driver code during driver signature enforcement.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A better understanding of the embodiments can be obtained from the following detailed description in conjunction with the following drawings, in which.

DETAILED DESCRIPTION

Figure 1A:
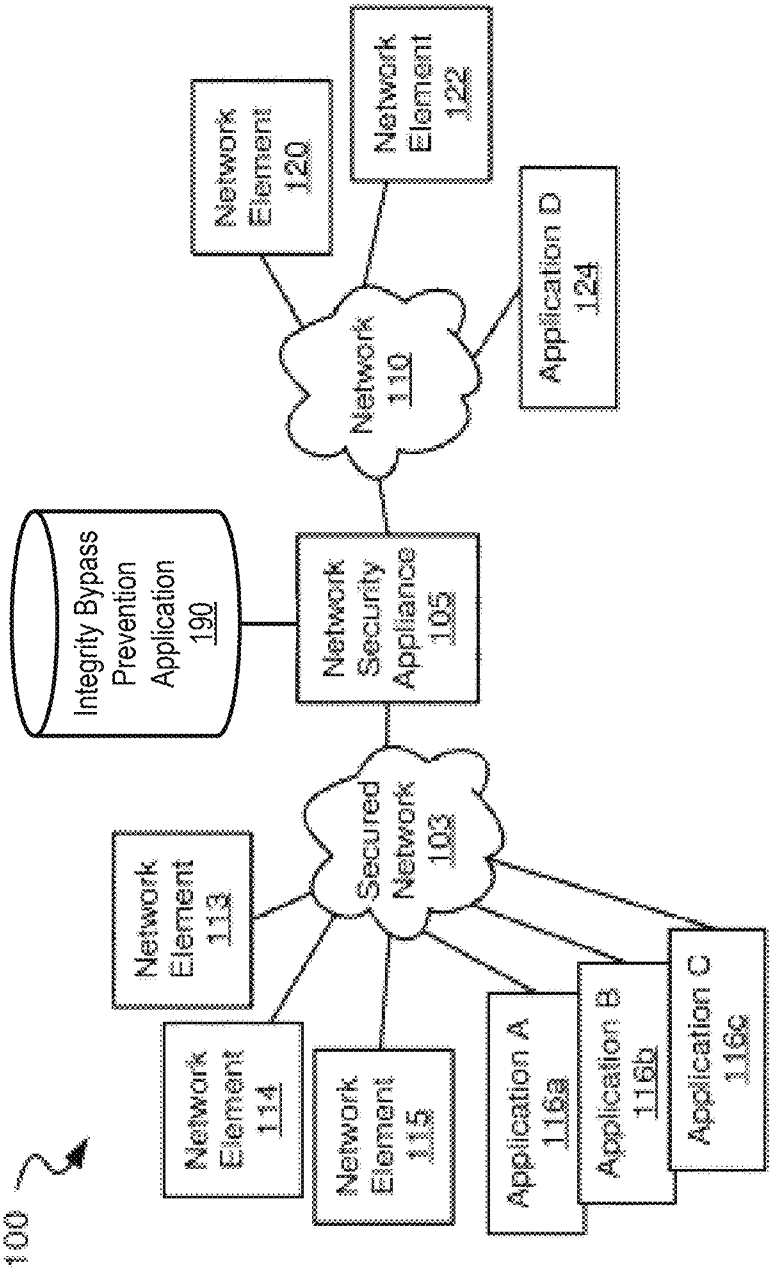
FIGS. 1A-1C illustrate embodiments of a network architecture including a code integrity verification system.

According to one embodiment, a mechanism is provided to perform attestation on a computing system for internal operating system (OS) data structures and monitor execution steps of a driver loading procedure to detect tampering in real-time.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), DoS attack detection appliances (e.g., the FORTIDDOS family of DoS attack detection and mitigation appliances) and endpoint protection, detection and response appliances (e.g., FORTIEDR family of security appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "Driver Signature Enforcement (DSE)" as used herein refers to an operating system security feature that verifies that only trusted drivers are installed on a computing system to improve security of the operating system by detecting if an unsigned driver or system file is being loaded into the kernel, or if a system file has been modified.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Turning to FIG. 1A, network architecture 100 is shown in accordance with some embodiments. In the context of network architecture 100, a network security appliance 105 controls access to network elements within a secured network 103. Secured network 103 may be any type of communication network known in the art. Those skilled in the art will appreciate that, secured network 103 can be a wireless network, a wired network, or a combination thereof that can be implemented as one of the various types of networks, such as an Intranet, a Local Area Network (LAN), a Wide Area Network (WAN), an Internet, and the like. Further, secured network 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Secured network 103 provides for internetwork communications between network elements 113, 114, 115 and applications 116 (e.g., application A 116 a, application B 116 b, and application C 116 c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Network security appliance 105 executes a integrity bypass prevention application 190 that is maintained on a computer readable medium communicably coupled to network security appliance 105. Execution of integrity bypass prevention application 190 by network security appliance 105 causes processing resources to detect loading of a driver and perform just in time attestation of operating system data structures and variables of to detect tampering with the driver. Although described above as operating within network security appliance 105, other embodiments of integrity bypass prevention application 190 may be implemented within any network element operating within network 100.

Figure 1B:
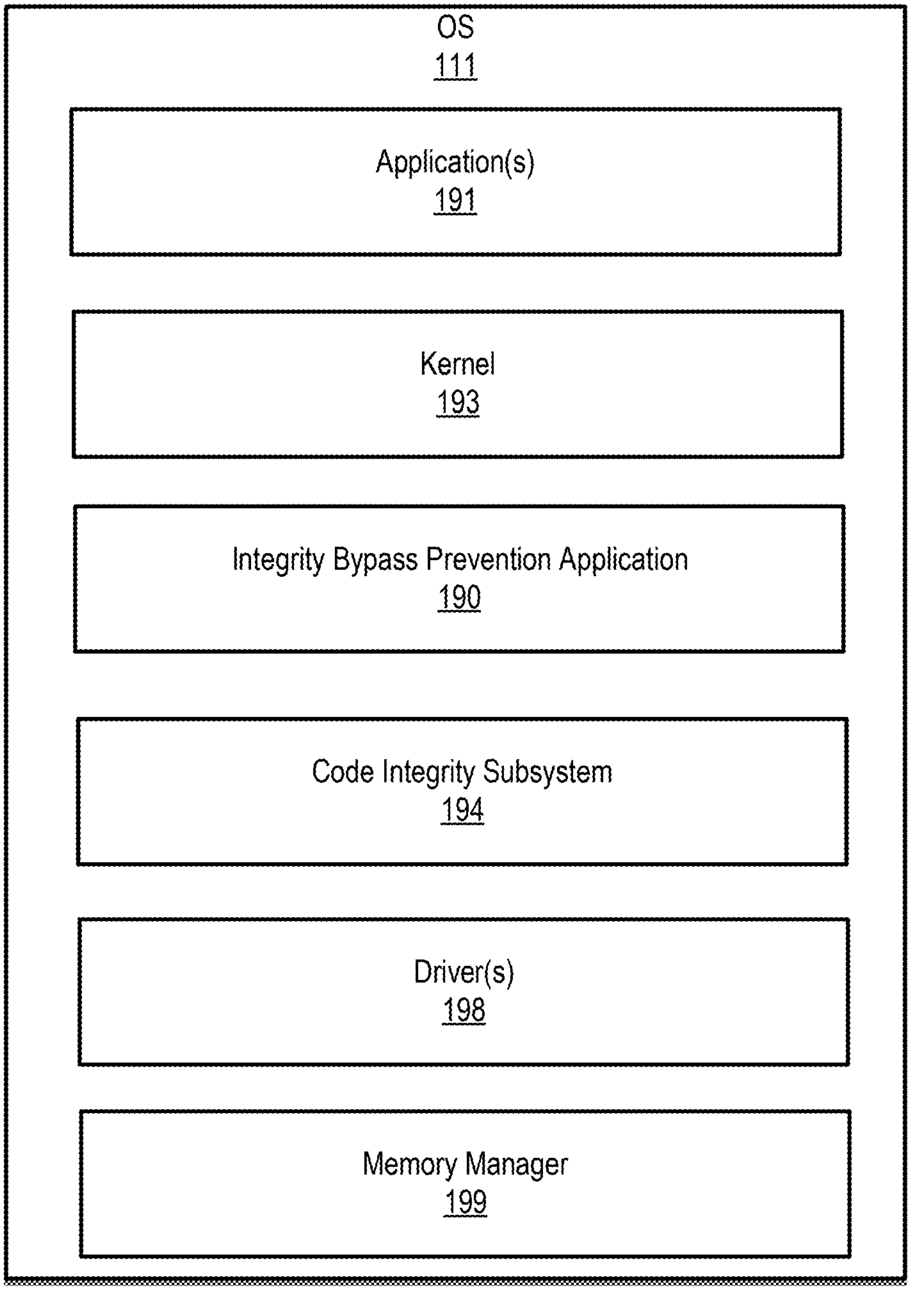

FIG. 1B illustrates an embodiment of an operating system (OS) 111 on which integrity bypass prevention application 190 may be implemented. As shown, OS 111 also includes one or more applications 191, kernel 193, code integrity subsystem 194, one or more drivers 198 and memory manager 199. Kernel 193 is a core OS 111 program that has control over a computer system (e.g., appliance 105 or network element) and manages resources, processes, and security. Kernel-level access provides the highest level of access to system resources, which can grant privileges and control. Code integrity subsystem 194 performs DSE to verify drivers 198.

Drivers 198 comprise interfaces that enable a hardware device to interface with OS 111. For example, when an application 191 needs to read data from a hardware device, the application 191 calls a function implemented by kernel 193. Kernel 193 then calls a function implemented by a driver 198. Memory manager 199 manages the primary memory for a computing system. For example, memory manager 199 allocates and deallocates memory resources efficiently to prevent memory leaks and overallocation, and optimize system performance. Memory manager 199 also implements memory protection mechanisms, prevent memory conflicts, and address fragmentation.

Figure 1C:
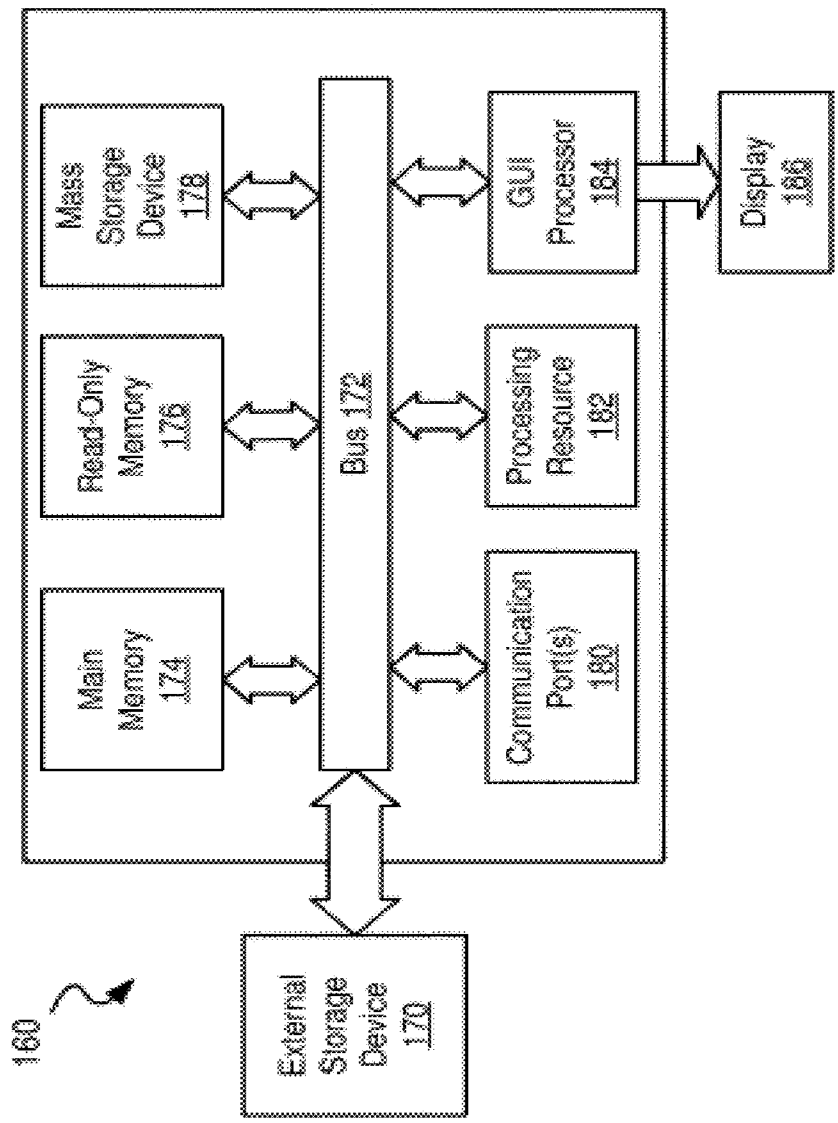

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, one or more processing resources (e.g., processing circuitry) 182, and a graphical user interface (GUI) processor 184. GUI processor 184 drives a display 186. In one embodiment, computer system 160 may represent some portion of any of network security appliance 105.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc—Read Only Memory (CD-ROM), Compact Disc—Rewritable (CD-RW), Digital Video Disk—Read Only Memory (DVD-ROM). Components described above are meant only to show various possibilities. In no way should the aforementioned example computer systems limit the scope of the present disclosure.

According to one embodiment, code integrity subsystem 194 comprises an executable image (e.g., CI.dll) that verifies the integrity of binary image files as they are loaded into memory from the disk. Code integrity subsystem 194 is initialized by kernel 193 at boot time (e.g., by the function call order: nt!Phase1Initialization->nt! SeInitSystem-> nt!SepInitializeCodeIntegrity). The nt!SepInitializeCodeIntegrity function sets an internal global variable (e.g., nt!g_CiEnabled) to 1 (true) and calls a CI.dll function (e.g., CiInitialize) to initialize a global function table (e.g., nt! g_CiCallbacks) of kernel 193 and an internal configuration variable (CI!g_CiOptions) that is exposed when DSE is enforced by code integrity subsystem 194.

When a driver 198 is loaded for execution by kernel 193 memory manager 199 performs a routine (e.g., nt!MmLoadSystemImage->nt! . . . [skipped]->nt! MmCreateSection->nt!MiValidateImageHeader) to load an executable image associated with the driver 198 into kernel 193 memory. The nt! MiValidateImageHeader routine ensures that a system module has a valid digital signature appended by subsequently calling back to code integrity subsystem 194 via pointers in nt!g_CiCallbacks after checking nt!g_CiEnabled.

A vulnerability exists between the kernel 193 and verification performed at code integrity subsystem 194 transition. For instance, an attacker may interfere in the transition by gaining control of the verification, thus enabling the attacker to control the result of the verification on all loaded driver code. The verification results may be controlled by modifying the CI!g_CiOptions, nt!g_CiEnabled and nt!g_CiCallbacks variables to temporarily disable DSE.

Figure 2:
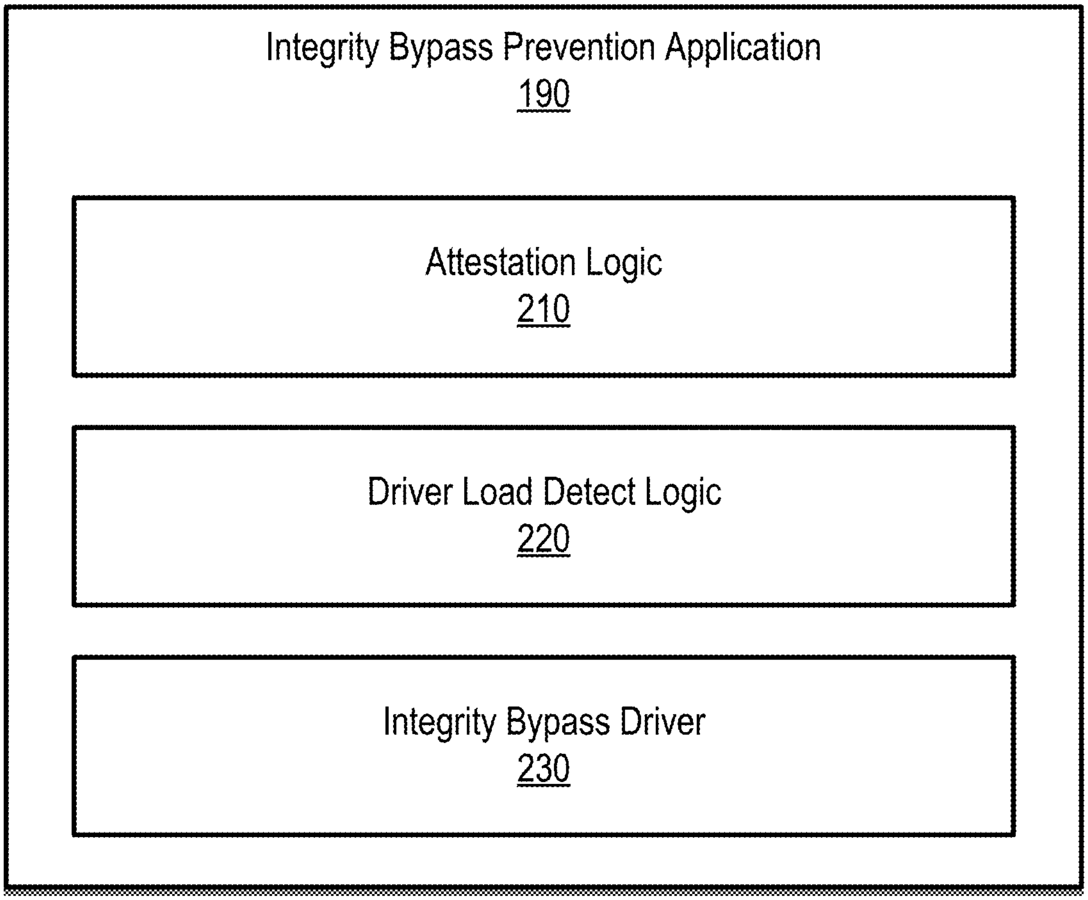
FIG. 2 illustrates one embodiment of an integrity bypass prevention application.

According to one embodiment, integrity bypass prevention (or bypass prevention) application 190 supplements verification performed at code integrity subsystem 194 by preventing the modification of the global variables that enable integrity verification to be bypassed during DSE. FIG. 2 illustrates one embodiment of bypass prevention application 190. As shown in FIG. 2, bypass prevention application 190 includes attestation logic 210, driver load detect logic 220 and integrity bypass driver 230. Driver load detect logic 220 detects the loading of a driver being loaded within OS 111.

In one embodiment, attestation logic 210 is implemented to perform just-in time attestation to detect tampering upon detection by driver load detect logic 210 of a driver 198 being loaded. In such an embodiment, attestation logic 210 checks internal memory structures and variables by pattern matching during runtime. In a further embodiment, attestation logic 210 sets flags associated with the internal memory structures and variables. Thus, the internal structures and variables may be referred to as follows:

g_CiOptions in CI.dll as "CiOptions flag."

nt!g_CiEnabled in ntoskrnl.exe as "CiEnabled flag."

nt!g_CiCallbacks as "CiCallbacks structure." According to one embodiment, attestation logic 210 captures baseline flag and callback values (or baseline values) upon initialization of integrity bypass driver 230. In such an embodiment, attestation logic 210 captures current flag and callback values (or current values) upon detection of the loading of additional drivers. Subsequently, attestation logic 210 determines whether there is a difference between the current values and the baseline values and blocks the loading operation upon determining that there is a mismatch between the current and baseline values. However, the DSE process to validate the driver executable image is allowed upon determining that the current values match the baseline values.

Figure 3:
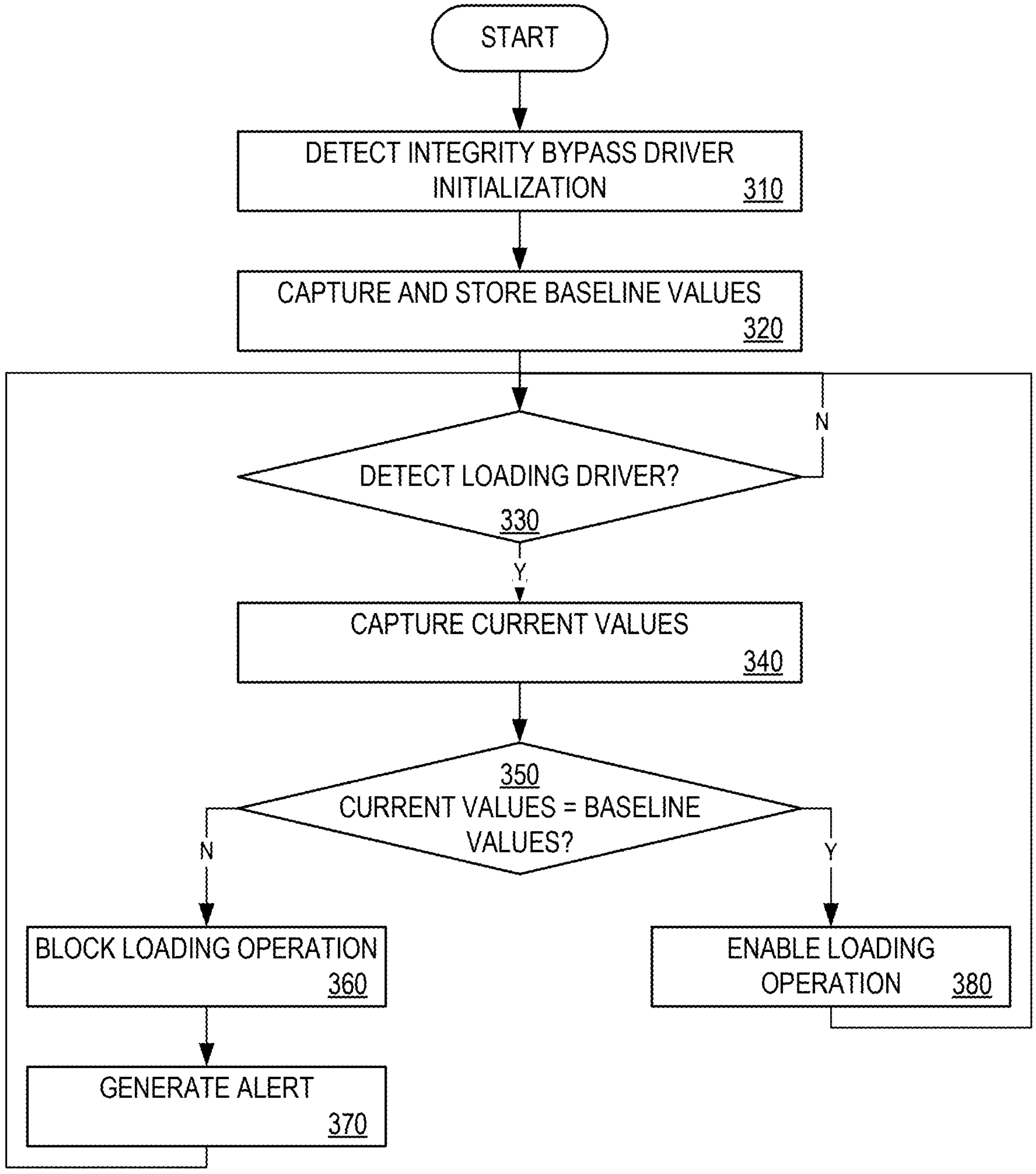
FIG. 3 is a flow diagram illustrating one embodiment of a process for performing integrity bypass prevention.

FIG. 3 is a flow diagram illustrating one embodiment of a process for performing attestation of internal OS data structures for integrity bypass prevention. At processing block 310, initialization integrity bypass driver 230 is detected. At processing block 320, the baseline values are captured and stored. At decision block 330, a determination is made as to whether the loading of a driver 198 has been detected. If not, control is returned to decision block 330 to await a loading driver 198. Otherwise, the current values are captured upon detection of a driver loading, processing block 340.

At decision block 350, a determination is made as to whether the current values match the baseline values. The driver 198 loading operation is blocked, processing block 360, upon a determination that the current values do not match the baseline values. At processing block 370, an alert is generated to indicate that a potential malicious attack has been detected. Subsequently, control is returned to processing block 330 to await the loading of another driver 198. Upon a determination at decision block 350 of a match between the current values and baseline values, the driver 198 loading operation is enabled to continue. Thus, the DSE process may subsequently be performed at code integrity subsystem 194, processing block 380. Control is again returned to processing block 330 to await a loading driver 198.

As mentioned above, driver load detect logic 220 detects the loading of a driver being loaded. However, the conventional image load notify kernel routine to detect when a driver is loaded cannot be used because it does not allow interfering and controlling the loading and blocking of a load operation. According to one embodiment, driver load detect logic 220 includes mechanisms to control the loading and blocking of the load operation upon detection of driver loading and the results of the attestation.

Figure 4:
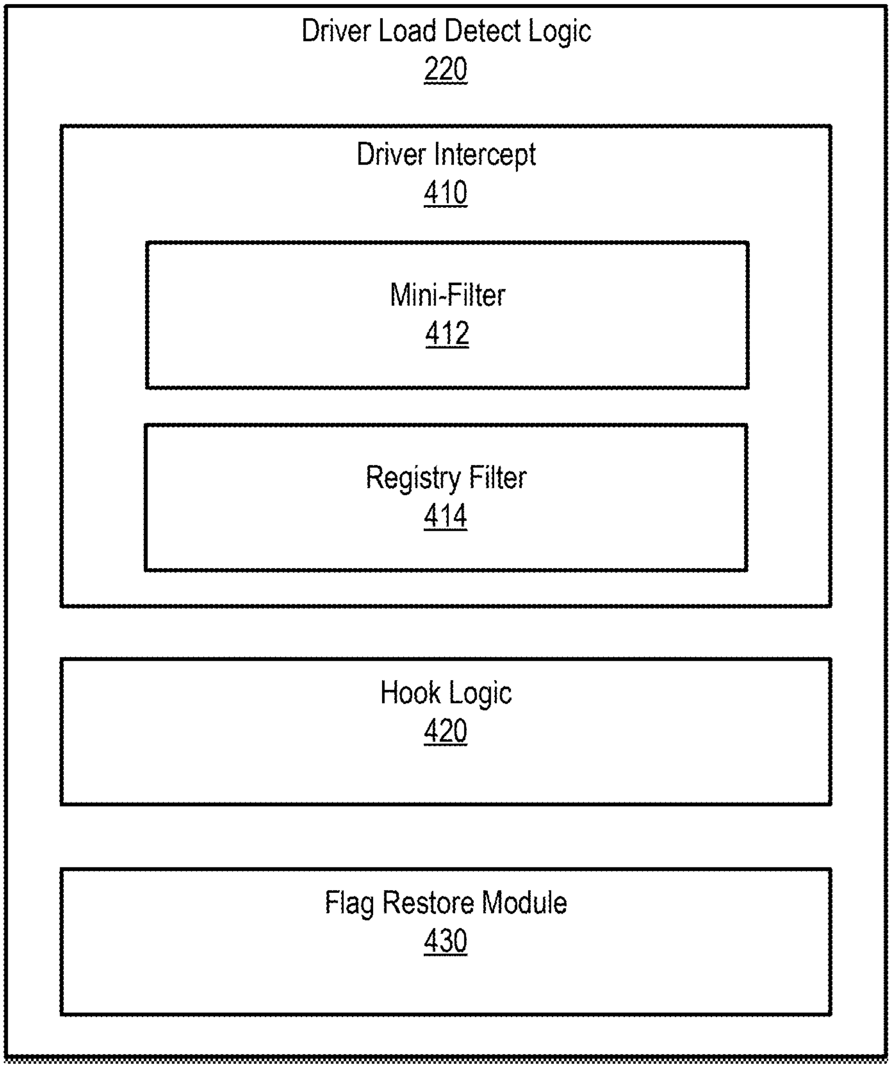
FIG. 4 illustrates one embodiment of driver load detect logic.

FIG. 4 illustrates one embodiment of driver load detect logic 220 including driver intercept 410. In one embodiment, driver load detect logic 220 implements a mini-filter 412 intercept driver to detect when a driver is being loaded. In this embodiment, mini-filter 412 comprises a mini-filter with callback for a file system (FSFilter) callback operation. The FSFilter callback operation is called when (a) a file is opened (IRP_MJ_CREATE) with execution permissions (FILE_EXECUTE); (b) section creation when lock is acquired (IRP_MJ_ACQUIRE_FOR_SECTION_SYNCHRONIZATION)or (c) file read (IRP_MJ_READ) by reading the file header and parsing it to verify the file is a driver (e.g., file begins IMAGE_DOS_HEADER. e_magic is "MZ, get IMAGE_DOS_HEADER. e_lfanew to find IMAGE_NT_HEADERS structure, IMAGE_NT_HEADERS. Signature is "PE\0\0" and IMAGE_NT_HEADERS. FileHeader. Machine is 0x8664 and IMAGE_NT_HEADERS. OptionalHeader. Subsystem is 1). File attributes are included with a structure (FLT_IO_PARAMETER_BLOCK) that has the parameters for an I/O operation that is represented by callback data structure (e.g., FLT_CALLBACK_DATA).

In embodiments, callbacks occur in system process context, which can be checked by using kernel 193 PsGetCurrentThread with PsIsSystemThread or PsGetCurrentProcess with PsIsSystemProcess API functions. On these callbacks, failing the file access will stop the driver 198 load operation, thus completely blocking the load operation. In another embodiment, driver load detect logic 220 implements a registry filter 414 to intercept driver loading to determine whether a callback invocation occurred in the system process context to indicate a driver being loaded. In such an embodiment, registry filter 414 comprises a registry filter callback for opening of keys (RegNtPreOpenKeyEx for HKEY_LOCAL_MACHINE\SYSTEM\CurrentControlSet\Services\<name>) and reading values under a registry tree (e.g., RegNtPreQueryValueKey for HKEY_LOCAL_MACHINE\SYSTEM\CurrentControlSet\Services\<name>\Type where value type is DWORD and value data is 1 or 2 or 4 or 8) that stores information about each service and driver installed on the system. as mentioned above, callbacks occur in system process context, which can be checked by using kernel 193 PsGetCurrentThread with PsIsSystemThread or PsGetCurrentProcess with PsIsSystemProcess API functions. Failing the registry access will again stop the driver 198 load operation, thus completely blocking the load operation.

In yet another embodiment, driver load detect logic 220 implements hook logic 420 to detect when a driver is being loaded. In this embodiment, hook logic 420 comprises a load driver routine and driver call back using a DeviceIoControl function. The load driver routine loads a driver into the system by using the DriverServiceName as specified in the registry path to initialize and load. Thus, hook logic 420 returns without going through the actual NtLoadDriver routine and the driver load operation will be blocked.

Driver load detect logic 220 also includes flag restore logic 430 that operates with driver intercept 410 and hook logic 420 to restore the flags back to their original state to enable code integrity subsystem 194 to operate to enable or reject the driver load operation.

Figure 5:
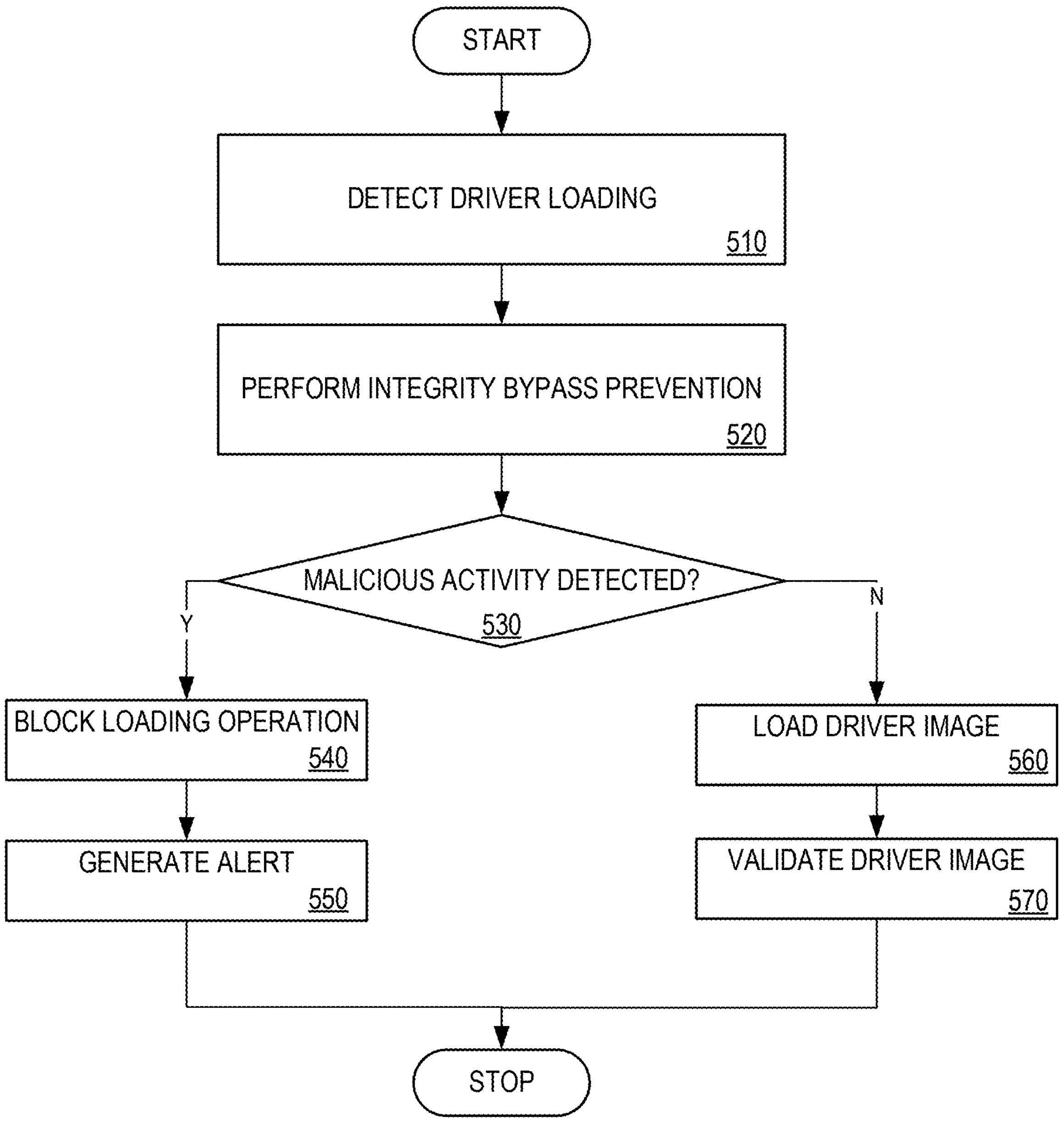
FIG. 5 is a flow diagram illustrating one embodiment of a code integrity process.

FIG. 5 is a flow diagram illustrating one embodiment of a code integrity process. At processing block 510, a driver loading operation is detected. At processing block 520, code integrity bypass prevention is performed, as discussed above. At decision block 530, a determination is made as to whether possible malicious activity has been detected. If so, the loading operation is blocked, processing block 540, and an alert is generated, processing block 550. Otherwise, the driver image is loaded, processing block 560, and validated, processing block 570.

Thus, it will be appreciated by those of ordinary skill in the art that the diagrams, schematics, illustrations, and the like represent conceptual views or processes illustrating systems and methods. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing described embodiments. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C. and N, the text should be interpreted as requiring only one element from the group, not A plus N, or B plus N, etc.

While the foregoing describes various embodiments, other and further embodiments may be devised without departing from the basic scope thereof. The scope of the embodiments is determined by the claims that follow. The embodiments are not limited to the described embodiments, versions or examples, which are included to enable a person having ordinary skill in the art to make and use the embodiments when combined with information and knowledge available to the person having ordinary skill in the art.

What is claimed is:

1. A system comprising:
one or more processing resources; and
a memory device, coupled to the one or more processing resource, having stored therein instructions that when executed by the processing resource cause the processing resources to:
detect a driver loading for execution; and
perform attestation of operating system data structures and variables in response to detecting the driver loaded for execution, including:
pattern matching during runtime to check internal variables; and
identifying global variables that enable integrity verification to be bypassed during Driver Signature Enforcement (DSE);
determining whether current flag and callback values match baseline flag and callback values upon detecting the driver loading for execution and prior to loading a driver image;
loading the driver image upon a determination that the current values match the baseline values; and
validating the driver image.

2. The system of claim 1, wherein the memory device having stored therein instructions that when executed by the processing resource further cause the processing resources to:
block the driver from loading upon a determination that the current baseline flag and callback values do not match the flag and callback baseline values; and
generate an alert.

3. The system of claim 2, wherein the memory device having stored therein instructions that when executed by the processing resource further cause the processing resources to intercept the driver upon detecting the loading.

4. The system of claim 3, wherein the driver is intercepted via a file system callback operation.

5. The system of claim 4, wherein the driver is intercepted and a determination is made as to whether a callback invocation occurred on system process context to indicate a driver load.

6. The system of claim 4, wherein blocking the driver from loading comprises failing driver file access.

7. The system of claim 3, wherein the driver is intercepted via a registry callback operation.

8. The system of claim 7, wherein blocking the driver from loading comprises failing driver registry access.

9. The system of claim 3, wherein the driver is intercepted using a load driver routine hook and driver call back.

10. The system of claim 1, wherein the memory device having stored therein instructions that when executed by the processing resource further cause the processing resources to restore the flag values upon loading the driver image.

11. The system of claim 10, wherein the flag values are associated with internal operating system memory structures and variables.

12. The system of claim 1, wherein the memory device having stored therein instructions that when executed by the processing resource further cause the processing resources to:

capture the baseline flag and callback values upon initialization of the driver; and store the baseline values.

13. The system of claim 12, wherein the memory device having stored therein instructions that when executed by the processing resource further cause the processing resources to capture the current flag and callback values upon detecting the driver loading.

14. A method comprising:

detecting a driver for execution; and performing attestation of operating system data structures and variables in response to detecting the driver loaded for execution, including:

pattern matching during runtime to check internal variables;

identifying global variables that enable integrity verification to be bypassed during Driver Signature Enforcement (DSE);

determining whether current flag and callback values match baseline flag and callback values upon detecting the driver loading for execution and prior to loading a driver image;

loading the driver image upon a determination that the current values match the baseline values; and validating the driver image.

15. The method of claim 14, further comprising:

blocking the driver from loading upon a determination that the current baseline flag and callback values do not match the flag and callback baseline values; and generating an alert.

16. The method of claim 14, further comprising restoring the flag values upon loading the driver image.

17. The method of claim 14, further comprising:

capturing the baseline flag and callback values upon initialization of the driver; and storing the baseline values.

18. The method of claim 17, further comprising capturing the current flag and callback values upon detecting the driver loading.

19. At least one non-transitory computer readable medium having instructions stored thereon, which when executed by one or more processors, cause the processors to:

detect a driver loading for execution; and perform attestation of operating system data structures and variables in response to detecting the driver loaded for execution, including:

pattern matching during runtime to check internal variables;

identifying global variables that enable integrity verification to be bypassed during Driver Signature Enforcement (DSE);

determining whether current flag and callback values match baseline flag and callback values upon detecting the driver loading for execution and prior to loading a driver image;

loading a driver image upon the determination that the current values match the baseline values; and validating the driver image.

20. The computer readable medium of claim 19, having instructions stored thereon, which when executed by one or more processors, further cause the processors to:

block the driver from loading upon a determination that the current baseline flag and callback values do not match the flag and callback baseline values; and generate an alert.

* * * * *